United States Patent [19]
Kim et al.

[11] Patent Number: 5,892,501
[45] Date of Patent: Apr. 6, 1999

[54] THREE DIMENSIONAL WIRELESS POINTING DEVICE

[75] Inventors: Jeong Yeol Kim, Kyungki-do; Duk Chin Chwa, Seoul, both of Rep. of Korea

[73] Assignee: LG Electronics Inc., Seoul, Rep. of Korea

[21] Appl. No.: 781,171

[22] Filed: Jan. 8, 1997

[30] Foreign Application Priority Data

Jan. 17, 1996 [KR] Rep. of Korea ........................ 884/1996
Jan. 17, 1996 [KR] Rep. of Korea ........................ 885/1996

[51] Int. Cl.$^6$ ........................................... G09G 5/08
[52] U.S. Cl. ........................ 345/158; 345/166; 356/141.5
[58] Field of Search ................................. 345/158, 166, 345/181; 356/141.5, 141.3

[56] References Cited

U.S. PATENT DOCUMENTS

| | | | |
|---|---|---|---|
| 5,440,114 | 8/1995 | Barbier et al. | 345/158 |
| 5,566,087 | 10/1996 | Vdigt et al. | 345/166 |
| 5,574,479 | 11/1996 | Odell | 345/158 |
| 5,598,187 | 1/1997 | Ide et al. | 345/158 |
| 5,710,623 | 1/1998 | Kim | 356/141.5 |

*Primary Examiner*—Thomas Mullen
*Assistant Examiner*—John Tweel, Jr.
*Attorney, Agent, or Firm*—Loeb & Loeb LLP

[57] ABSTRACT

Three dimensional wireless pointing device for calculating coordinates and controlling a position of a cursor in a three dimensional space is disclosed, including a transmission side having a plurality of ultrasonic wave generating parts and a single infrared ray emitting part or a single ultrasonic wave generating part and a plurality of infrared ray emitting parts arranged in a certain axis direction at certain angles and a reception side having a plurality of infrared ray receiving sensors and a single ultrasonic wave receiving sensor arranged to cross the ultrasonic wave generating part(s) and the infrared ray emitting part(s) in the transmission side at a right angle, thereby to measure intensities of the infrared ray(s) and the ultrasonic wave(s) varied depending on direction of pointing and calculate a difference of relative arrival times of the infrared ray and the ultrasonic wave to obtain coordinate values of a position in a three dimensional space, whereby a position of cursor or menu, which is a control objective, can be controlled using the obtained coordinate values.

21 Claims, 7 Drawing Sheets

THREE DIMENSIONAL WIRELESS POINTING DEVICE

BACKGROUND OF THE INVENTION

1. Field of the Invention

The present invention relates to a three dimensional wireless pointing device which can calculate coordinates and control a position of cursor in a three dimensional space.

2. Discussion of the Related Art

In the wireless pointing devices, there are in general an ultrasonic wireless pointing device in which a plurality of ultrasonic wave generating parts and ultrasonic wave receiving sensors are arranged to cross each other at a right angle for using a relative phase difference of the ultrasonic wave signals caused depending on a direction of pointing in calculating coordinates of a pointed position, and infrared wireless pointing device in which a plurality of infrared ray emitting parts and infrared ray receiving sensors are arranged to cross each other at a right angle for using a relative intensity difference of infrared signals caused depending on a direction of pointing in calculating coordinates of the pointed position. The ultrasonic wireless pointing device was filed by the same applicant (U.S. Pat. Ser. No. 08/580,757), and the infrared wireless pointing device was also filed by the same applicant(U.S. Pat. Ser. No. 08/679,644).

However, the ultrasonic or infrared wireless pointing device, a pointing device for calculating coordinates of a position on a two dimensional plane and controlling a position of a cursor, has a problem that the pointing device can not point a three dimensional spatial position on a display space of a three dimensional display, such as a hologram.

SUMMARY OF THE INVENTION

Accordingly, the present invention is directed to a three dimensional wireless pointing device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the three dimensional wireless pointing device includes position pointing means having an ultrasonic wave generating part and a plurality of infrared ray emitting parts arranged in a predetermined axis direction at predetermined angles for generating an ultrasonic wave signal and emitting a plurality of infrared ray signals of different characteristics into a space; detecting means having a plurality of ultrasonic wave receiving sensors and an infrared ray receiving sensor mounted on different positions on a straight line on a body of an electronic appliance to cross at a right angle to the ultrasonic wave generating part and the plurality infrared ray emitting parts on the position pointing means for receiving the ultrasonic wave signal and the infrared ray signals transmitted from the position pointing means; spatial position analyzing means for converting the infrared signal detected in the detecting means into a digital signal and a timing signal, comparing the ultrasonic wave signals detected in the detecting means with a reference signal to convert into timing signals, and detecting a phase difference of each of the ultrasonic wave signals with reference to a time when the infrared ray is detected; coordinate calculating means for calculating a detection time difference of each of the ultrasonic waves detected at the plurality of ultrasonic wave receiving sensors with reference to a detection time of the infrared signal converted into the timing signal in the spatial position analyzing means to obtain a first coordinate value, measuring detected intensities of the plurality of infrared ray signals of different characteristics received from the infrared ray emitting parts and converted into the digital signal in the spatial position analyzing means to obtain a second coordinate value, and calculating an average arrival time of the ultrasonic waves with reference to the time when the infrared rays are detected at the infrared ray receiving sensor to obtain a third coordinate value, thereby to determine a three dimensional relative position between the position pointing means and the detecting means; and, a position controlling means for taking the three dimensional position determined by the coordinate calculating means as the present position caused by a position movement of the position pointing means relative to the detecting means.

In another aspect of the present invention, there is provided a three dimensional wireless pointing device, including position pointing means having a plurality of ultrasonic wave generating parts and an infrared ray emitting part arranged in a predetermined axis direction at predetermined angles for generating a plurality of ultrasonic wave signals of different characteristics and emitting an infrared ray signal into a space; detecting means having a plurality of ultrasonic wave receiving sensors and an infrared ray receiving sensor mounted on the body of the electronic appliance at different positions on a straight line to cross at a right angle to the plurality of ultrasonic wave generating parts and the infrared ray emitting part in the position pointing means for receiving the ultrasonic wave signals and the infrared ray signal transmitted from the position pointing means;

spatial position analyzing means for converting the infrared signal detected in the detecting means into a digital signal and a timing signal, comparing the ultrasonic wave signals detected in the detecting means with a reference signal to convert into timing signals, and detecting a relative phase difference of each of the ultrasonic wave signals with reference to a time when the infrared ray is detected; coordinate calculating means for measuring a time difference of an average detection time of each of the ultrasonic waves detected at the plurality of ultrasonic wave receiving sensors with reference to a detection time of the infrared signal converted into the timing signal in the spatial position analyzing means to obtain a first coordinate value, measuring intensities of the plurality of ultrasonic waves of different characteristics received at one of the plurality of ultrasonic wave receiving sensors with reference to the detection time of the infrared signal converted into the timing signal in the spatial position analyzing means to obtain a second coordinate value, and calculating an average arrival time of the ultrasonic waves with reference to the detection time of the infrared ray signal converted into the timing signal in the spatial position analyzing means to obtain a third coordinate value, thereby to determine a three dimensional relative position between the position pointing means and the detecting means; and, a position controlling means for taking the three dimensional position determined by the coordinate calculating means as the present position caused by a position movement of the position pointing means relative to the detecting means.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF THE PREFERRED EMBODIMENTS

Reference will now be made in detail to the preferred embodiments of the present invention, examples of which are illustrated in the accompanying drawings.

A three dimensional wireless pointing device of the present invention comprises at large an electronic appliance, which is an objective of pointing, and a position pointing means for pointing the objective. The electronic appliance is a general term for the electronic appliances, such as display, for example, television and monitor, microcomputer, word processor, work station, robot, and peripherals of a large sized computer. In explanation of the present invention, the display will be explained, as an example. And, the position pointing means may be a remote controller, a ring on a finger, mouse and stylus pen, and transmit a signal to the electronic appliance with or without a line.

FIRST EMBODIMENT

Figure 1:
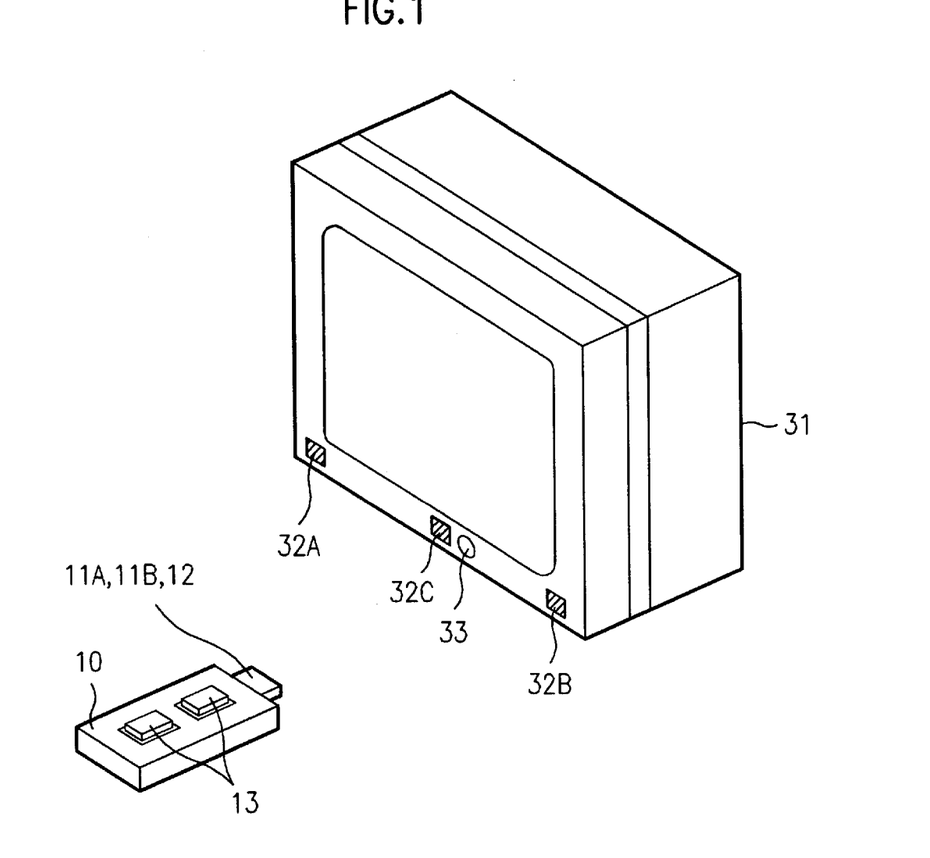
FIG. 1 illustrates a perspective view of a three dimensional wireless pointing device in accordance with a first embodiment of the present invention.

FIG. 1 illustrates a perspective view of a three dimensional wireless pointing device in accordance with a first embodiment of the present invention, wherein a display 31 is shown which has ultrasonic wave receiving sensors 32A and 32B mounted on a lower(or upper) part of the display 31 at both ends thereof spaced a predetermined distance apart in an X-axis direction, and an ultrasonic wave receiving sensor 32c and an infrared ray receiving sensor 33 mounted at the center of the lower part.

Figures 2A, 2B:
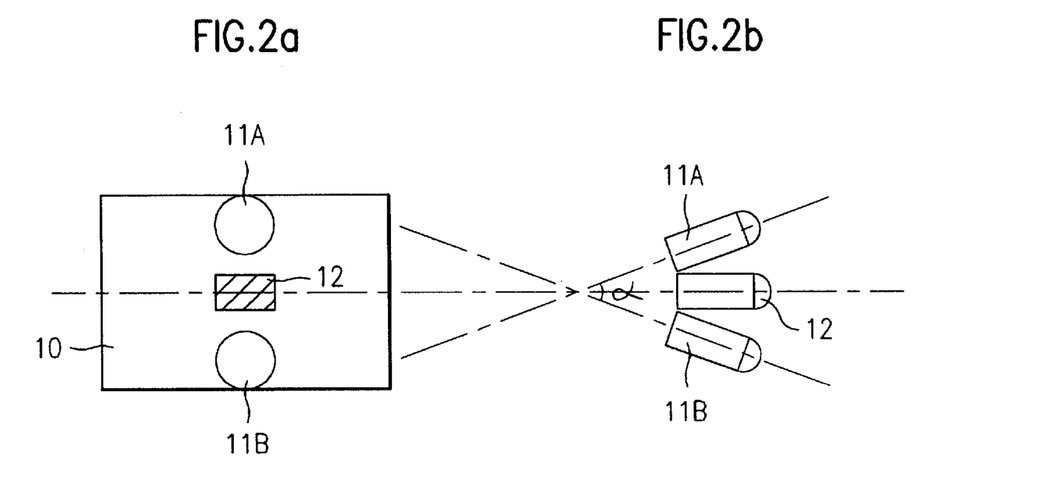
FIG. 2a illustrates a front view of an arrangement of the ultrasonic wave generating part and the infrared ray emitting parts in the position pointing means shown in FIG. 1.
FIG. 2b illustrates a side view of the arrangement of the ultrasonic wave generating part and the infrared ray emitting parts in the position pointing means shown in FIG. 1.
Figure 3A:
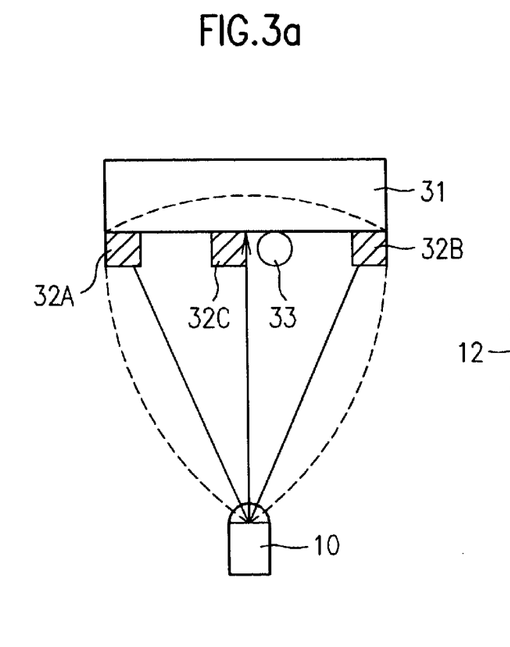
FIG. 3a illustrates a plan view of a beam distribution of the ultrasonic wave generating part and the infrared ray emitting parts in the position pointing means shown in FIG. 1.
Figure 3B:
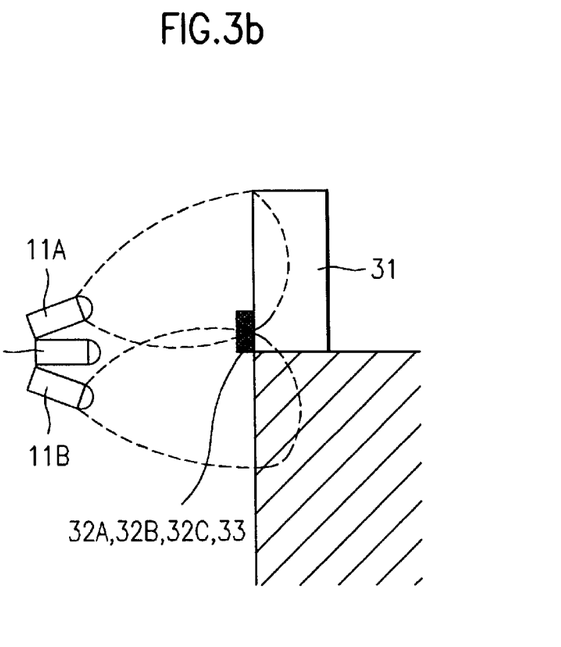
FIG. 3b illustrates a side view of the beam distribution of the ultrasonic wave generating part and the infrared ray emitting parts in the position pointing means shown in FIG. 1.

FIGS. 2a and 2b illustrate front, and side views of an arrangement of the infrared ray emitting parts 11A and 11B and the ultrasonic wave generating part 12 in the position pointing means shown in FIG. 1, wherein it can be seen that the infrared ray emitting parts 11A and 11B are arranged in a Y-axis direction with an angle α between them and the ultrasonic wave generating part 12 arranged between the infrared ray emitting parts 11A and 11B. The position pointing means and the receiving means are arranged so that their directions of axes are orthogonal to each other. FIGS. 3a and 3b illustrate plan, and side views of a beam distribution of the infrared ray emitting parts and the ultrasonic wave generating part in the position pointing means shown in FIG. 1.

Figure 4:
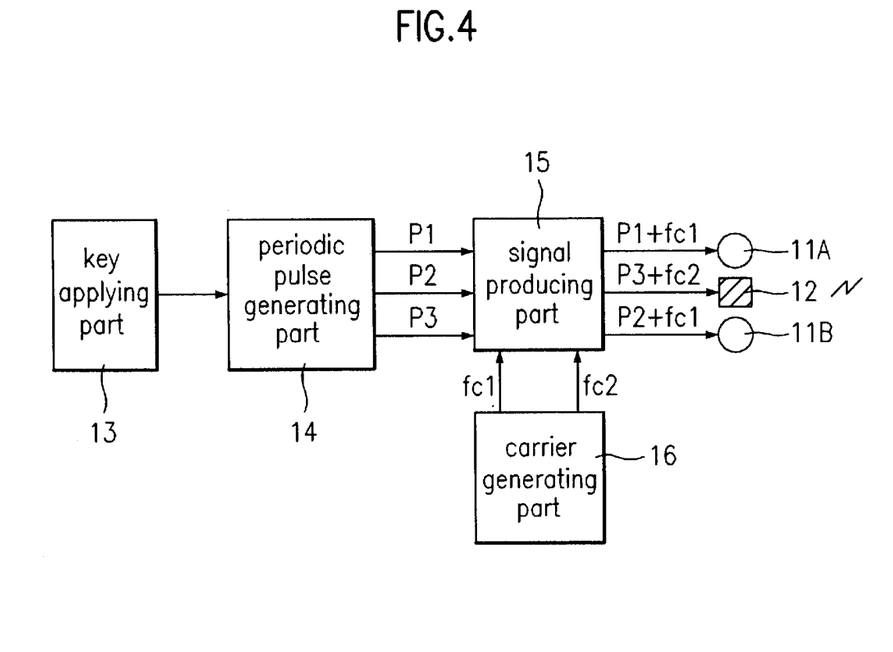
FIG. 4 illustrates a block diagram of position pointing means in a three dimensional wireless pointing device in accordance with the first embodiment of the present invention.

FIG. 4 illustrates a block diagram of the position pointing means in a three dimensional wireless pointing device in accordance with the first embodiment of the present invention.

Referring to FIG. 4, the position pointing means in a three dimensional wireless pointing device in accordance with the first embodiment of the present invention includes a key applying part 13 having keys for moving a cursor, selection commands and operation commands, a periodic pulse generating part 14 for receiving a key signal from the key applying part 13 in generation of periodic pulses of a code identifying waveform and a synchronization identifying waveform, a signal producing part 15 for converting the periodic pulse signal generated in the periodic pulse generating part 14 into infrared ray signals P1 and P2 and an ultrasonic wave signal P3 and overlapping with carrier signals fc1 and fc2, a carrier generating part 16 for generating an infrared carrier signal fc1 and an ultrasonic carrier signal fc2 and applying to the signal producing part 15 for preventing disturbance or interference of the infrared ray signals and the ultrasonic wave signal during transmission, and a plurality of signal generating parts of infrared ray emitting parts 11A and 11B and an ultrasonic wave generating part 12 for transmitting the infrared ray signals P1+fc1 and P2+fc1 and the ultrasonic wave signal P3+fc2 from the signal producing part 15 into a space. The infrared ray emitting parts 11A and 11B and the ultrasonic wave generating part 12 of the plurality of signal generating parts are arranged in a Y-axis direction at a predetermined angle α.

Figure 5:
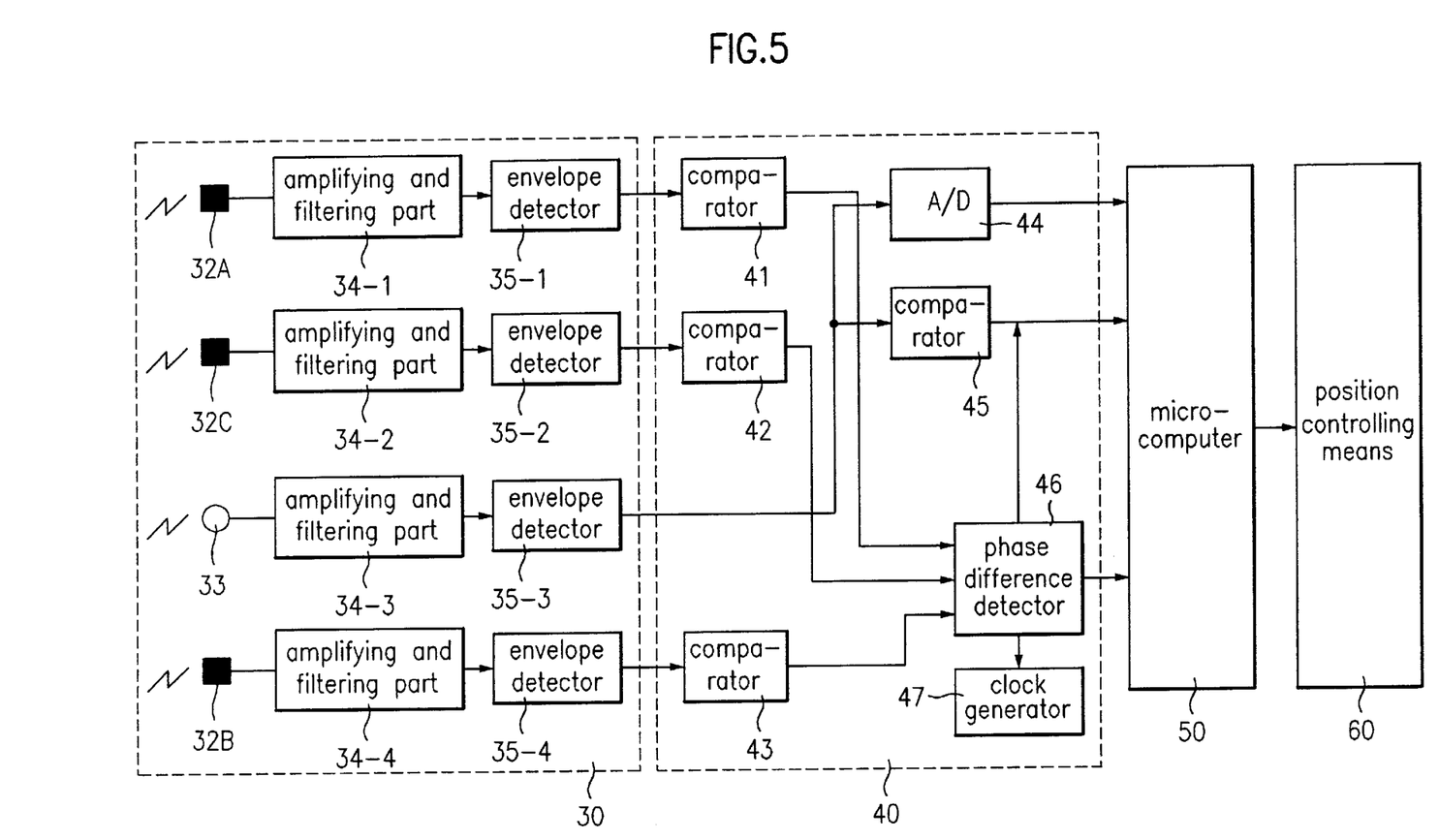
FIG. 5 illustrates a block diagram of signal receiving means in a three dimensional wireless pointing device in accordance with the first embodiment of the present invention.

FIG. 5 illustrates a block diagram of signal receiving means in a three dimensional wireless pointing device in accordance with the first embodiment of the present invention.

Referring to FIG. 5, the signal receiving means in a three dimensional wireless pointing device in accordance with the first embodiment of the present invention includes detection means 30 having the plurality of ultrasonic wave receiving sensors 32A, 32B and 32C and the infrared ray receiving sensor 33 mounted on the display 31 spaced predetermined distances apart in the X-axis direction crossed at a right angle to the infrared ray emitting parts 11A and 11B and the ultrasonic wave generating part 12 in the position pointing means 10 for detecting the ultrasonic waves and the infrared ray, spatial position analyzing means 40 for converting the infrared signal and the ultrasonic wave signals detected by the detecting means 30 into a digital signal and timing signals respectively and detecting phases of the ultrasonic waves with reference to the time when the infrared signal is detected, a microcomputer 50 for using an intensity of the infrared signal and the phases of the ultrasonic wave signals digitized and detected in the spatial position analyzing means 40 respectively in obtaining X, Y, Z coordinates of a position to determine a relative three dimensional position between the position pointing means 10 and the detecting means 30, and position controlling means 60 for taking the three dimensional position determined by the microcomputer 50 as the present position caused by a position movement of the position pointing means 10 relative to the detecting means 30 in controlling a control objective, such as a cursor or a menu.

The detecting means 30 includes the plurality of ultrasonic wave receiving sensors 32A, 32C and 32B for receiving the ultrasonic wave signals transmitted from the position pointing means 10, amplifying and filtering parts 34-1, 34-2 and 34-4 for amplifying the weak ultrasonic wave signals received at the ultrasonic wave receiving sensors 32A, 32C and 32B, respectively and passing the ultrasonic wave signals of a carrier frequency band respectively, envelope detectors 35-1, 35-2 and 35-4 for removing carrier signals from the ultrasonic wave signals from the amplifying and filtering parts 34-1, 34-2 and 34-4 respectively and detecting intensity levels of acoustic waves received at the ultrasonic wave receiving sensors 32A, 32B and 32C respectively, the infrared ray receiving sensor 33 for receiving the infrared ray signal transmitted from the position pointing means 10, an amplifying and filtering part 34-3 for amplifying the weak infrared ray signal received at the infrared ray receiving sensor 33 and passing the infrared ray signal of a carrier frequency band, an envelope detector 35-3 for removing a carrier signal from the infrared ray signal from the amplifying and filtering parts 34-3 and detecting an intensity level of the infrared ray received at the infrared ray receiving sensor 33.

The spatial position analyzing means 40 includes a first comparator 41 for comparing an envelope waveform of the ultrasonic wave signal received at the ultrasonic wave receiving sensor 32A with an internal reference signal to convert into a timing signal, a second comparator 42 for comparing an envelope waveform of the ultrasonic wave signal received at the ultrasonic wave receiving sensor 32C with an internal reference signal to convert into a timing signal, a third comparator 43 for comparing an envelop waveform of the ultrasonic wave signal received at the ultrasonic wave receiving sensor 32B with an internal reference signal to convert into a timing signal, an ADC (Analog/Digital Converter) 44 for digitizing an envelope waveform of the infrared ray signal received at the infrared ray receiving sensor 33, a fourth comparator 45 for comparing an envelop waveform of the infrared ray signal received at the infrared ray receiving sensor 33 with an internal reference signal to convert into a timing signal for using as a reference signal in calculation of coordinates and code analysis, a phase difference detector 46 for detecting a relative phase difference of the ultrasonic wave signal from each of the first to third comparators 41~43 with reference to a time when the infrared ray from the fourth comparator 45 is detected, and a clock generator 47 for generating and applying clock signals to the phase difference detector 46.

In the three dimensional wireless pointing device in accordance with the first embodiment of the present invention having the aforementioned system, upon reception of a key signal of various key signals(for example, keys for a cursor movement, selection commands, operation order, and etc.) through the key applying part 13 on the position pointing means 10, the periodic pulse generating part 14 generates periodic pulses of a code identifying waveform according to the applied key signal and, in addition, generates periodic pulses of a synchronization identifying waveform for a key signal of cursor moving order, converts infrared ray signals P1 and P2 of different characteristics and an ultrasonic wave signal P3, and applies to the signal producing part 15. In this instant, the carrier generating part 16 generates and applies an infrared carrier signal fc1 and an ultrasonic carrier signal fc2 to the signal producing part 15 for preventing disturbance or interference of the ultrasonic waves and the infrared ray signal during transmission.

The signal producing part 15 overlaps the infrared carrier signal fc1 and the ultrasonic carrier signal fc2 from the carrier generating part 16 with the infrared ray signals P1 and P2 of different characteristics and the ultrasonic wave signal P3 from the periodic pulse generating part 14, and transmits the overlapped infrared ray signals P1+fc1 and P2+fc1 and ultrasonic wave signal P3+fc2 into a space through the infrared ray emitting parts 11A and 11B and the ultrasonic wave generating part 12, respectively. In this instant, the periodic pulse signal generated in the periodic pulse generating part 14 is loaded on the infrared signals in most cases. The distribution of the infrared rays and the ultrasonic wave transmitted in the space through the infrared ray emitting parts 11A and 11B and the ultrasonic wave generating part 12 respectively is as shown in FIGS. 3a and 3b.

The ultrasonic wave receiving sensors 32A, 32C and 32B in the detecting means 30, attached on both ends and center in an X-axis direction spaced predetermined distances apart at a lower part of the display 31, receive the ultrasonic wave transmitted from the position pointing means 10, and apply to the amplifying and filtering parts 34-1, 34-2 and 34-4 connected to the ultrasonic wave receiving sensors 32A, 32C and 32B, respectively. And, the infrared ray receiving sensor 33, attached on the lower part of the display 31 in the X-axis direction spaced a predetermined distance apart from the ultrasonic wave receiving sensor 32C attached on the center of the display 31, receives the infrared ray signal transmitted from the position pointing means 10, and applies to the amplifying and filtering part 34-3. In this instant, the infrared ray receiving sensor 33 receives the signal transmitted from the infrared ray emitting part 11A and, after a predetermined time, receives the signal transmitted from the infrared ray emitting part 11B, again.

Accordingly, the amplifying and filtering part 34-1 amplifies the ultrasonic wave signal received at the ultrasonic wave receiving sensor 32A and only produces its carrier frequency band to the envelope detector 35-1, and the envelope detector 35-1 removes a carrier frequency from the output of the amplifying and filtering part 34-1 and detects an amplitude level of the acoustic wave received at the ultrasonic wave receiving sensor 32A. The amplifying and filtering part 34-2 amplifies the ultrasonic wave signal received at the ultrasonic wave receiving sensor 32C and only produces its carrier frequency band to the envelope detector 35-2, and the envelope detector 35-2 removes a carrier frequency from the output of the amplifying and filtering part 34-2 and detects an amplitude level of the acoustic wave received at the ultrasonic wave receiving sensor 32C. The amplifying and filtering part 34-3 amplifies the infrared ray signal received at the infrared ray receiving sensor 33 and produces only its carrier frequency band to the envelope detector 35-3, and the envelope detector 35-3 removes a carrier frequency from the output of the amplifying and filtering part 34-3 to detect an intensity level of the light received at the infrared ray receiving sensor 33. And, the amplifying and filtering part 34-4 amplifies the ultrasonic wave signal received at the ultrasonic wave receiving sensor 32B and only produces its carrier frequency band to the envelope detector 35-4, and the envelope detector 35-4 removes a carrier frequency from the output of the amplifying and filtering part 34-4 and detects an amplitude level of the acoustic wave received at the ultrasonic wave receiving sensor 32B.

The output from the envelope detector 35-1 is applied to the first comparator 41 in the spatial position analyzing means, and the first comparator 41 compares the envelope waveform of the ultrasonic wave signal received through the ultrasonic wave receiving sensor 32A to an internal reference signal to convert into a timing signal, with which analysis of a time interval is possible and applies to the phase difference detector 46. The output from the envelope detector 35-2 is applied to the second comparator 42, and the second comparator 42 compares the envelope waveform of the ultrasonic wave signal received through the ultrasonic wave receiving sensor 32C to an internal reference signal to convert into a timing signal and applies to the phase difference detector 46. The output from the envelope detector 35-4 is applied to the third comparator 43, and the third comparator 43 compares the envelope waveform of the ultrasonic wave signal received through the ultrasonic wave receiving sensor 32C to an internal reference signal to convert into a timing signal and applies to the phase difference detector 46. And, the output from the envelope detector 35-3 which detects the envelope of the infrared ray signal is received at the ADC 44 in the spatial position analyzing means 40 and converted into a digital signal, and applied to the microcomputer 50 as well as the comparator 45 to be compared with an internal signal to be converted into a timing signal, with which an analysis of a timing interval is possible. In this instant, the output from the fourth comparator 45 is applied to the phase difference detector 46 as a reference signal for use in a coordinate calculation as well as to the microcomputer 50 for analyzing a code. That is, the output of the fourth comparator 45 which converts the infrared ray signal into a timing signal is used as all the reference signals in the three dimensional wireless pointing device of the present invention.

In synchronization to the clock generated in the clock generator 47, the phase difference detector 46 detects an arrival time difference of each of the ultrasonic wave signals received through the first to third comparators 41-43 with reference to an arrival time of the infrared ray signal received through the fourth comparator 45 to detect a phase difference of each of the ultrasonic wave signals and applies to the microcomputer 50.

The microcomputer 50 uses the time intervals in the timing signal from the fourth comparator 45 in analyzing a code identifying waveform and a synchronization identifying waveform, conducts a general process if the identified code is a command code not requiring a movement of the cursor, and calculates X-, Y-, Z-axis coordinates of the data from the spatial position analyzing means 40 if the identified code is a command code for a movement of the cursor. If the identified code is a command code for a movement of the cursor, as each of the phases of the ultrasonic wave signal from the ultrasonic wave generating part 12 received at the ultrasonic wave receiving sensors 32A, 32B and 32C will show a relative difference depending on X-axis angles between the ultrasonic wave signal and the ultrasonic wave receiving sensors 32A, 32B and 32C, the microcomputer 50 uses this phenomenon in calculating the X-axis coordinate. That is, since the phase difference detector 46 calculates a detection time difference of each of the ultrasonic waves detected at each of the ultrasonic wave receiving sensors 32A, 32B and 32C with reference to the detection time of the infrared ray and applies to the microcomputer 50, the microcomputer 50 measures a relative phase difference of each of the ultrasonic wave signals detected through the ultrasonic wave receiving sensors 32A and 32B, or 32A, 32B and 32C, to calculate an X-axis coordinate.

And, since intensity levels of the infrared ray signals from the infrared ray emitting parts 11A and 11B at the infrared ray receiving sensor 33 will show a relative difference depending on Y-axis angles between the infrared ray signals and the infrared ray receiving sensor 33, the microcomputer 50 uses this phenomenon in calculating the Y-axis coordinate.

And, with reference to a detection time of the infrared ray signal from the fourth comparator 45, a difference of an arrival time of the ultrasonic wave from the ultrasonic wave generating part 12 at the ultrasonic wave receiving sensor 32A, a difference of an arrival time of the ultrasonic wave from the ultrasonic wave generating part 12 at the ultrasonic wave receiving sensor 32B, and a difference of an arrival time of the ultrasonic wave from the ultrasonic wave generating part 12 at the ultrasonic wave receiving sensor 32C, are obtained, and the three time differences are averaged to obtain the Z-axis coordinate value. That is, a time difference between the arrival time of the infrared ray transmitted either through the infrared ray emitting part 11A or through the infrared ray emitting part 11B at the infrared ray receiving sensor 33 and the arrival time of the ultrasonic wave transmitted through the ultrasonic wave generating part 12 at the ultrasonic wave receiving sensor 32A, is calculated, to obtain a first Z-axis coordinate value, a time difference between the arrival time of the infrared ray transmitted either through the infrared ray emitting part 11A or through the infrared ray emitting part 11B at the infrared ray receiving sensor 33 and the arrival time of the ultrasonic wave transmitted through the ultrasonic wave generating part 12 at the ultrasonic wave receiving sensor 32B, is calculated, to obtain a second Z-axis coordinate value, and a time difference between the arrival time of the infrared ray transmitted either through the infrared ray emitting part 11A or through the infrared ray emitting part 11B at the infrared ray receiving sensor 33 and the arrival time of the ultrasonic wave transmitted through the ultrasonic wave generating part 12 at the ultrasonic wave receiving sensor 32C, is calculated, to obtain a third Z-axis coordinate value. And, the calculated three Z-axis coordinate values are averaged to obtain a final Z-axis coordinate value. This is possible because, as the infrared ray is a light and the ultrasonic wave is an acoustic wave, the arrival time of the infrared ray is earlier than the arrival time of the ultrasonic wave.

Thus, the microcomputer 50 obtains the X-, Y-, Z-axis coordinates to determine the three dimensional relative position difference between the position pointing means 10 and the detecting means 30, and the position controlling means 60 takes the three dimensional position determined by the microcomputer 50 as the present cursor position according to the relative position movement between the position pointing means 10 and the detecting means 30, and moves the cursor to the three dimensional position.

In the meantime, the position pointing means 10 may be adopted to transmit infrared rays of the same carrier frequency in different timings, or transmit infrared rays of carrier frequencies different from each other on the same time. And, a polarizing filter may be attached on each of the infrared ray emitting parts and the infrared ray receiving sensor so that one of the infrared ray emitting parts transmits a longitudinal wave of the infrared ray and the other of the infrared ray emitting parts transmits a transverse wave of the infrared ray separately, or infrared ray emitting parts and infrared ray receiving sensor of different infrared ray lengths may be provided to transmit infrared rays of different wavelengths from each other.

SECOND EMBODIMENT

Figure 6:
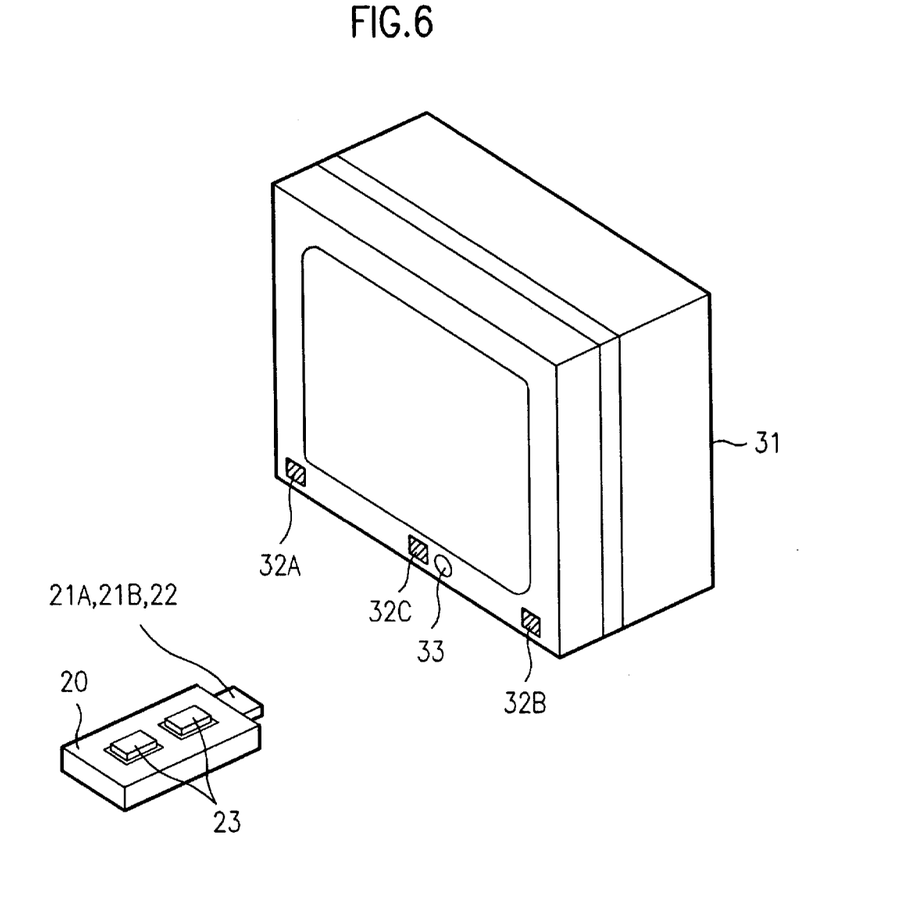
FIG. 6 illustrates a perspective view of a three dimensional wireless pointing device in accordance with a second embodiment of the present invention.

FIG. 6 illustrates a perspective view of a three dimensional wireless pointing device in accordance with a second embodiment of the present invention, of which position pointing means is different from that of the first embodiment, but receiving means is identical to that of the first embodiment. That is, the receiving means includes ultrasonic wave receiving sensors 32A and 32B attached on both ends of a lower part(or an upper part) of the display 31 spaced a predetermined distance apart in an X-axis direction, and an ultrasonic wave receiving sensor 32C and an infrared ray receiving sensor 33 attached on a center thereof.

Figure 7A:
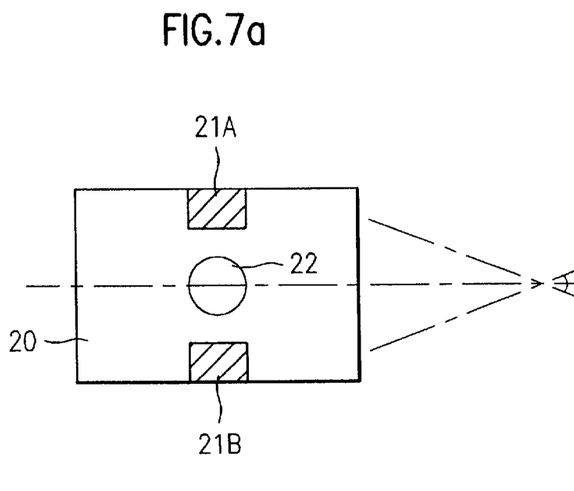
FIG. 7a illustrates a front view of an arrangement of the infrared ray emitting part and the ultrasonic wave generating parts in the position pointing means shown in FIG. 6.
Figure 7B:
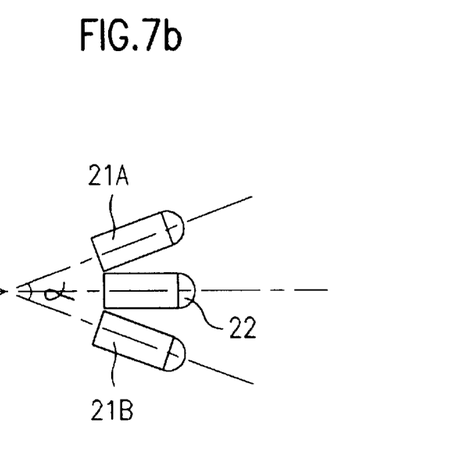
FIG. 7b illustrates a side view of the arrangement of the infrared ray emitting part and the ultrasonic wave generating parts in the position pointing means shown in FIG. 6.
Figure 8A:
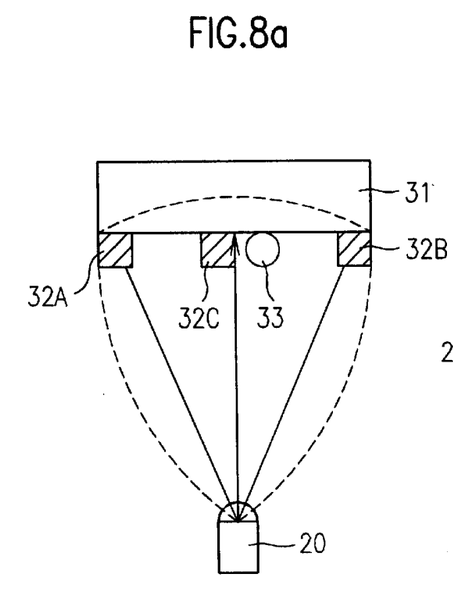
FIG. 8a illustrates a plan view of a beam distribution of the infrared ray emitting part and the ultrasonic wave generating parts in the position pointing means shown in FIG. 6.
Figure 8B:
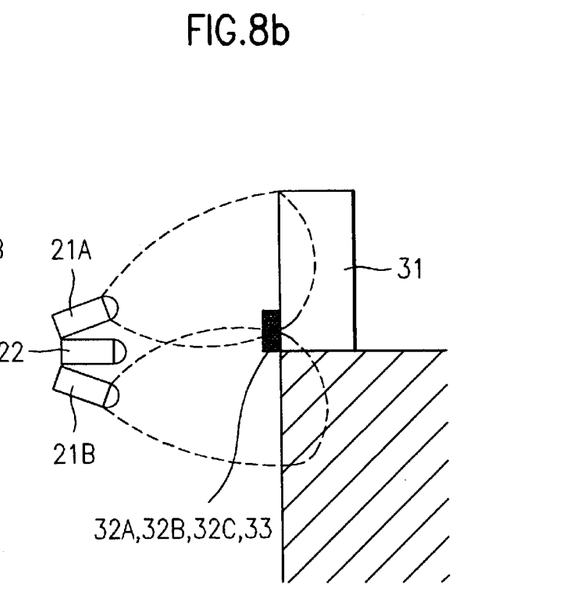
FIG. 8b illustrates a side view of the beam distribution of the infrared ray emitting part and the ultrasonic wave generating parts in the position pointing means shown in FIG. 6.

FIGS. 7a~7b illustrate front, and side views of an arrangement of the ultrasonic wave generating parts 21A and 21B and the infrared ray emitting part 22 in the position pointing means 20 shown in FIG. 6, wherein it can be seen that the ultrasonic wave generating parts 21A and 21B are arranged in an Y-axis direction with an angle α between them, and the infrared ray emitting part 22 arranged between the ultrasonic wave generating parts 21A and 21B. The arranged directions of axes of the position pointing means and the receiving means are orthogonal to each other. FIGS. 8a~8b illustrate plan, and side views of a beam distribution of the ultrasonic wave generating parts and the infrared ray emitting part in the position pointing means shown in FIG. 6.

Figure 9:
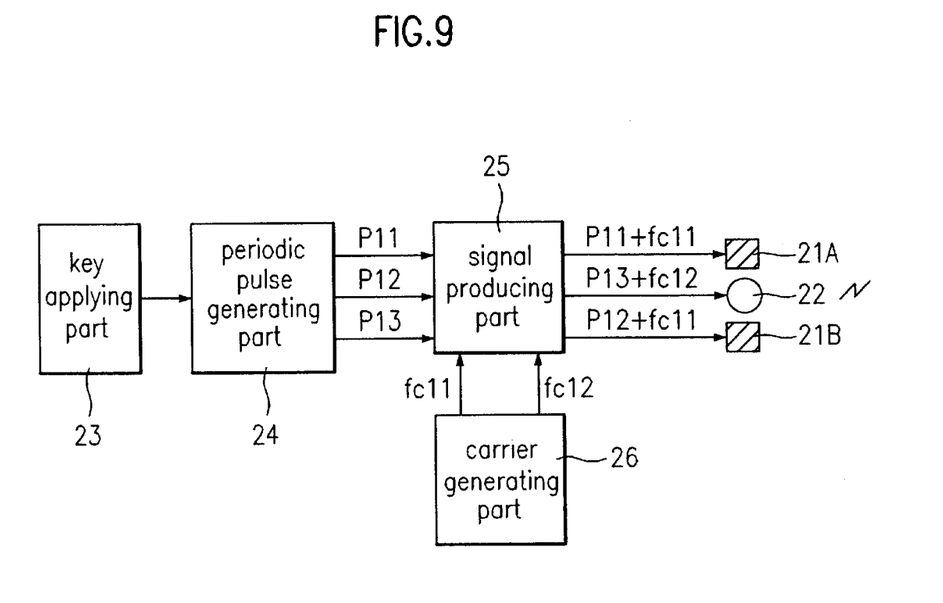
FIG. 9 illustrates a block diagram of position pointing means in a three dimensional wireless pointing device in accordance with the second embodiment of the present invention.

FIG. 9 illustrates a block diagram of the position pointing means in the three dimensional wireless pointing device in accordance with the second embodiment of the present invention.

Referring to FIG. 9, the position pointing means 20 in the three dimensional wireless pointing device in accordance with the second embodiment of the present invention includes a key applying part 23 having keys for moving a cursor, selection commands and operation commands, a periodic pulse generating part 24 for receiving a key signal from the key applying part 23 in generation of periodic pulses of a code identifying waveform and a synchronization identifying waveform, a signal producing part 25 for converting the periodic pulse signal generated in the periodic pulse generating part 24 into ultrasonic wave signals P11 and P12 of different characteristics and an infrared ray signal P13 and overlapping with carrier signals fc11 and fc12, a carrier generating part 26 for generating an ultrasonic carrier signal fc11 and an infrared carrier signal fc12 and applying to the signal producing part 25 for preventing disturbance or interference of the ultrasonic wave signals and the infrared ray signal during transmission, and a plurality of signal generating parts of ultrasonic wave generating parts 21A and 21B and an infrared ray emitting part 22 for transmitting the ultrasonic wave signals P11+fc11 and P12+fc11 and the infrared ray signal P13+fc12 from the signal producing part 25 into a space. The ultrasonic wave generating parts 21A and 21B and the infrared ray emitting part 22 of the plurality of signal generating parts are arranged in the Y-axis direction at a predetermined angle α.

In the meantime, a system of the receiving means of the second embodiment is not shown because the system is identical to that of the first embodiment. However, as the spatial position analyzing method of the receiving means of the second embodiment is different from the receiving means of the first embodiment due to the difference of the position pointing means of the second embodiment from that of the first embodiment, the system of the position pointing means of the second embodiment will be explained with reference to FIG. 5.

Referring to FIG. 5, the receiving means in the three dimensional wireless pointing device in accordance with the second embodiment of the present invention includes detecting means 30 having a plurality of ultrasonic wave receiving sensors 32A, 32B and 32C and the infrared ray receiving sensor 33 mounted on the display 31 spaced predetermined distances apart in the X-axis direction crossed at a right angle to the plurality of the ultrasonic wave generating parts 21A and 21B and the infrared ray emitting part 22 in the position pointing means 20 for detecting the ultrasonic waves and the infrared ray, spatial position analyzing means 40 for digitizing the infrared signal and converting the ultrasonic wave signal detected by the detecting means 30 into a timing signal and detecting phase differences of the ultrasonic waves with reference to the time when the infrared signal is detected, a microcomputer 50 for using an intensity of the infrared signal digitized in the spatial position analyzing means 40 and phase differences of the ultrasonic wave signals in obtaining X, Y, Z coordinates of a position for determining a three dimensional relative position between the position pointing means 20 and the detecting means 30, and position controlling means 60 for taking the three dimensional position determined by the microcomputer 50 as the present position caused by a relative movement of the position pointing means 20 to the detecting means 30 in controlling a control objective, such as a cursor or a menu.

The detecting means 30 includes the plurality of ultrasonic wave receiving sensors 32A, 32C and 32B each for receiving the ultrasonic wave signals transmitted from the position pointing means 20, amplifying and filtering parts 34-1, 34-2 and 34-4 for amplifying the weak ultrasonic wave signals received at the ultrasonic wave receiving sensors 32A, 32C and 32B, respectively and only passing the ultrasonic wave signals of a carrier frequency band, envelope detectors 35-1, 35-2 and 35-4 for removing carrier signals from the ultrasonic wave signals from the amplifying and filtering parts 34-1, 34-2 and 34-4 and detecting intensity levels of the acoustic waves received at the ultrasonic wave receiving sensors 32A, 32C and 32B respectively, the infrared ray receiving sensor 33 for receiving the infrared ray signal transmitted from the position pointing means 20, an amplifying and filtering part 34-3 for amplifying the weak infrared ray signal received at the infrared ray receiving sensor 33 and only passing the infrared ray signal of the carrier frequency band, an envelope detector 35-3 for removing a carrier signal from the infrared ray signal from the amplifying and filtering parts 34-3 and detecting an intensity level of the light received at the infrared ray receiving sensor 33.

The spatial position analyzing means 40 includes a first comparator 41 for comparing an envelope waveform of the ultrasonic wave signal received at the ultrasonic wave receiving sensor 32A with an internal reference signal to convert into a timing signal, a second comparator 42 for comparing an envelope waveform of the ultrasonic wave signal received at the ultrasonic wave receiving sensor 32C with an internal reference signal to convert into a timing signal, a third comparator 43 for comparing an envelope waveform of the ultrasonic wave signal received at the ultrasonic wave receiving sensor 32B with an internal reference signal to convert into a timing signal, an ADC (Analog/Digital Converter) 44 for digitizing an envelope waveform of the infrared ray signal received at the infrared ray receiving sensor 33, a fourth comparator 45 for comparing an envelope waveform of the infrared ray signal received at the infrared ray receiving sensor 33 with an internal reference signal to convert into a timing signal for using as a reference signal in calculation of coordinates and code analysis, a phase difference detector 46 for detecting a relative phase difference of the ultrasonic wave signal from each of the first to third comparators 41~43 with reference to a time when the infrared ray from the fourth comparator 45 is detected, and a clock generator 47 for generating and applying clocks to the phase difference detector 46.

In the three dimensional wireless pointing device in accordance with the second embodiment of the present invention having the aforementioned system, upon reception of a key signal of various key signals(for example, keys for a cursor movement, selection commands, operation order, and etc.) through the key applying part 23 on the position pointing means 20, the periodic pulse generating part 24 generates periodic pulses of a code identifying waveform according to the applied key signal and, in addition, generates periodic pulses of a synchronization identifying waveform for a key signal of cursor moving order, converts ultrasonic wave signals P11 and P12 of different characteristics and an infrared ray signal P13, and applies to the signal producing part 25. In this instant, the carrier generating part 26 generates and applies an ultrasonic wave carrier signal fc11 and an infrared ray carrier signal fc12 to the signal producing part 25 for preventing disturbance or interference of the ultrasonic wave signals and the infrared ray signal during transmission.

The signal producing part 25 overlaps the ultrasonic wave carrier signal fc11 and the infrared ray carrier signal fc12 from the carrier generating part 26 with the ultrasonic wave signals P11 and P12 of different characteristics and the infrared ray signal P13 from the periodic pulse generating part 24, and transmits the overlapped ultrasonic wave signals P11+fc11 and P12+fc11 and infrared ray signal P13+fc12 into a space through the ultrasonic wave generating parts 21A and 21B and the infrared ray emitting part 22, respectively. In this instant, the periodic pulse signal generated in the periodic pulse generating part 24 is loaded on the infrared signals in most cases. The distribution of the ultrasonic waves and the infrared ray transmitted in the space through the ultrasonic wave generating part 21A and 21B and the infrared ray emitting part 22 respectively is as shown in FIGS. 8a and 8b.

The ultrasonic wave receiving sensors 32A, 32C, and 32B in the detecting means 30, attached on both ends and center in an X-axis direction spaced predetermined distances apart at a lower part of the display 31, receive the ultrasonic wave signals transmitted from the position pointing means 20, and apply to the amplifying and filtering parts 34-1, 34-2 and 34-4 connected to the ultrasonic wave receiving sensors 32A, 32C, and 32B, respectively. In this instant, each of the plurality of ultrasonic wave receiving sensors 32A, 32C, and 32B receives the signal from the ultrasonic wave generating part 21A, and, after a predetermined time interval, receives the signal from the ultrasonic wave generating part 21B, again. And, the infrared ray receiving sensor 33, attached on the lower part of the display 31 in the X-axis direction spaced a predetermined distance apart from the ultrasonic wave receiving sensor 32C attached on the center of the display 31, receives the infrared ray signal transmitted from the position pointing means 20, and applies to the amplifying and filtering part 34-3.

Accordingly, the amplifying and filtering part 34-1 amplifies the ultrasonic wave signal received at the ultrasonic wave receiving sensor 32A and only produces the ultrasonic wave signal of a carrier frequency band to the envelope detector 35-1, and the envelope detector 35-1 removes a carrier frequency from the output of the amplifying and filtering part 34-1 and detects an intensity level of the acoustic wave received at the ultrasonic wave receiving sensor 32A. The amplifying and filtering part 34-2 amplifies the ultrasonic wave signal received at the ultrasonic wave receiving sensor 32C and only produces the ultrasonic wave signal of a carrier frequency band to the envelope detector 35-2, and the envelope detector 35-2 removes a carrier frequency from the output of the amplifying and filtering part 34-2 and detects an intensity level of the acoustic wave received at the ultrasonic wave receiving sensor 32C. The amplifying and filtering part 34-3 amplifies the infrared ray signal received at the infrared ray receiving sensor 33 and produces only the infrared ray of a carrier frequency band to the envelope detector 35-3, and the envelope detector 35-3 removes a carrier frequency from the output of the amplifying and filtering part 34-3 and detects an intensity level of the light received at the infrared ray receiving sensor 33. And, the amplifying and filtering part 34-4 amplifies the ultrasonic wave signal received at the ultrasonic wave receiving sensor 32B and only produces the ultrasonic wave of a carrier frequency band to the envelope detector 35-4, and the envelope detector 35-4 removes a carrier frequency from the output of the amplifying and filtering part 34-4 and detects an intensity level of the acoustic wave received at the ultrasonic wave receiving sensor 32B.

The output from the envelope detector 35-1 is applied to the first comparator 41 in the spatial position analyzing means 40, and the first comparator 41 compares the envelope waveform of the ultrasonic wave signal received through the ultrasonic wave receiving sensor 32A to an internal reference signal to convert into a timing signal, with which analysis of a time interval is possible, and applies to the phase difference detector 46. The output from the envelope detector 35-2 is applied to the second comparator 42, and the second comparator 42 compares the envelope waveform of the ultrasonic wave signal received through the ultrasonic wave receiving sensor 32C to an internal reference signal to convert into a timing signal and applies to the phase difference detector 46. The output from the envelope detector 35-4 is applied to the third comparator 43, and the third comparator 43 compares the envelope waveform of the ultrasonic wave signal received through the ultrasonic wave receiving sensor 32B to an internal reference signal to convert into a timing signal and applies to the phase difference detector 46. And, the output from the envelope detector 35-3 which detects the envelope of the infrared ray signal is received at the ADC 44 in the spatial position analyzing means 40 and converted into a digital signal, and applied to the microcomputer 50 as well as the comparator 45 to be compared with an internal reference signal to be converted into a timing signal, with which an analysis of a timing interval is possible. In this instant, the output from the fourth comparator 45 is applied to the phase difference detector 46 as a reference signal for use in a coordinate calculation as well as to the microcomputer 50 for analyzing a code. That is, the output of the fourth comparator 45 which converts the infrared ray signal into a timing signal is used as all the reference signals in the three dimensional wireless pointing device of the present invention.

In synchronization to the clock generated in the clock generator 47, the phase difference detector 46 detects an arrival time difference of each of the ultrasonic wave signals received through the first to third comparators 41–43 with reference to an arrival time of the infrared ray signal received through the fourth comparator 45 to detect a phase difference of each of the ultrasonic wave signals and applies to the microcomputer 50.

The microcomputer 50 uses the time intervals in the timing signal from the fourth comparator 45 in analyzing a code identifying waveform and a synchronization identifying waveform, conducts a general process if the identified code is a command code not requiring a movement of the cursor, and calculates X-, Y-, Z-axis coordinates of the data from the spatial position analyzing means 40 if the identified code is a command code for a movement of the cursor. Therefore, if the identified code is a command code for a movement of the cursor, as each of the intensity levels of the ultrasonic wave signals from the ultrasonic wave generating parts 21A and 21B received at the ultrasonic wave receiving sensors 32A, 32B and 32C will show a relative difference depending on X-axis angles between the ultrasonic wave signals and the ultrasonic wave receiving sensors 32A, 32B and 32C, the microcomputer 50 uses this phenomenon in calculating the X-axis coordinate value. That is, since the phase difference detector 46 detects a detection time difference of each of the ultrasonic waves detected at the ultrasonic wave receiving sensors 32A, 32B and 32C with reference to a time when the infrared ray signal is detected and applies to the microcomputer 50, the microcomputer 50 detects the ultrasonic wave signal transmitted from the ultrasonic wave generating part 21A through the plurality of ultrasonic wave receiving sensors 32A and 32B, or 32A, 32B and 32C with reference to the time of the infrared ray detection, and measures a relative phase difference of each of the detected ultrasonic wave signals, to obtain a first X-coordinate. And, the microcomputer 50 detects the ultrasonic wave signal transmitted from the ultrasonic wave generating part 21B with a predetermined time interval through the plurality of ultrasonic wave receiving sensors 32A and 32B, or 32A, 32B and 32C with reference to the time of the infrared ray detection, and measures a relative phase difference of each of the detected ultrasonic wave signals, to obtain a second X-coordinate values, to obtain a second X-coordinate. Then, the first, and second coordinate values are averaged to obtain a final X-axis coordinate.

And, since intensity levels of the ultrasonic waves from the ultrasonic wave generating parts 21A and 21B received at the ultrasonic wave receiving sensors 32A, 32B and 32C will show a relative difference depending on Y-axis angles between the ultrasonic waves and the ultrasonic wave receiving sensors 32A, 32B and 32C, the microcomputer 50 uses this phenomenon in calculating the Y-axis coordinate. That is, with reference to the detection time of the infrared ray signal produced from the fourth comparator 45, an arrival time difference of the ultrasonic wave transmitted from the ultrasonic wave generating part 21A at one of the plurality of ultrasonic wave receiving sensors 32A, 32B and 32C and an arrival time difference of the ultrasonic wave transmitted from the ultrasonic wave generating part 21B at one of the plurality of ultrasonic wave receiving sensors 32A, 32B and 32C, are obtained, and a relative difference of the two time differences are obtained to obtain the Y-axis coordinate value.

And, with reference to a detecting time of the infrared ray signal produced from the fourth comparator 45, an average arrival time of the ultrasonic waves is calculated to obtain a Z-axis coordinate value. That is, with reference to a detecting time of the infrared ray signal produced from the fourth comparator 45, an arrival time difference of the ultrasonic wave from the ultrasonic wave generating part 21A to one of the plurality of ultrasonic wave receiving sensors 32A, 32B and 32C is calculated to obtain a first Z-axis coordinate value, and an arrival time difference of the ultrasonic wave from the ultrasonic wave generating part 21B to one of the plurality of ultrasonic wave receiving sensors 32A, 32B and 32C is calculated to obtain a second Z-axis coordinate value, and the two coordinate values are averaged to obtain a final Z-axis coordinate value. This is possible because, as the infrared ray is a light and the ultrasonic waves are acoustic wave, the arrival time of the infrared ray at the receiving means is earlier than the arrival time of the ultrasonic waves at the receiving means.

Thus, the microcomputer 50 obtains the X-, Y-, Z-axis coordinates to determine the three dimensional relative position difference between the position pointing means 20 and the detecting means 30, and the position controlling means 60 takes the three dimensional position determined by the microcomputer 50 as the present cursor position according to the relative position movement between the position pointing means 20 and the detecting means 30, and moves the cursor to the three dimensional position.

In the meantime, the position pointing means 20 may be adopted to transmit ultrasonic waves of the same carrier frequency in different timings, or ultrasonic waves of carrier frequencies different from each other on the same time.

THIRD EMBODIMENT

Figure 10:
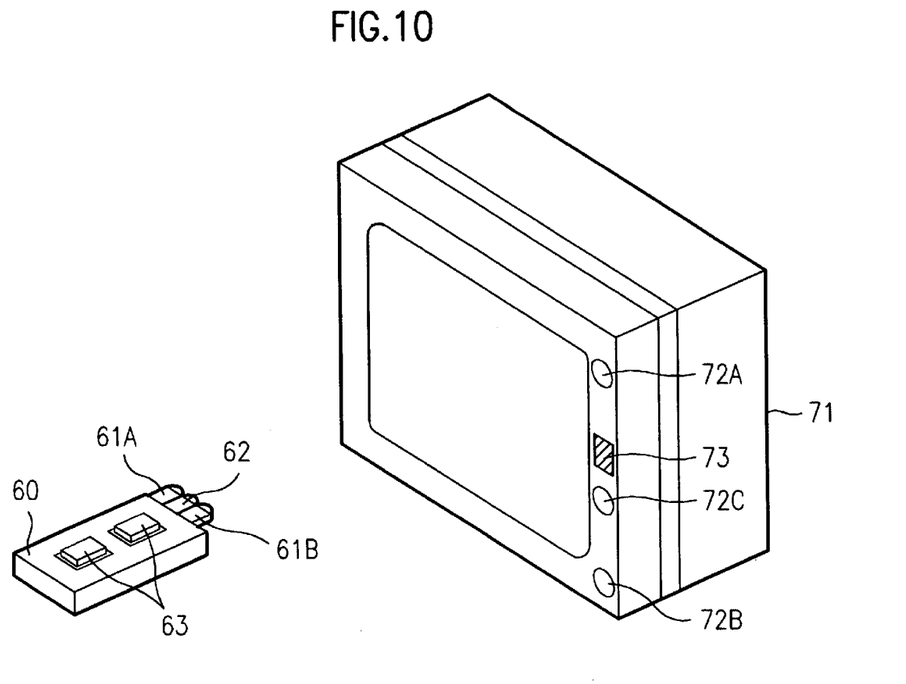
FIG. 10 illustrates a perspective view of a three dimensional wireless pointing device in accordance with a third embodiment of the present invention.

FIG. 10 illustrates a perspective view of a three dimensional wireless pointing device in accordance with a third embodiment of the present invention.

Referring to FIG. 10, the three dimensional wireless pointing device in accordance with a third embodiment of the present invention includes a position pointing means 60 having ultrasonic wave generating parts 61A and 611B arranged in an X-axis direction at a predetermined angle and an infrared ray emitting part 62 arranged between the ultrasonic wave generating parts 61 A and 61B, for transmitting ultrasonic wave signals and an infrared ray signal of predetermined cycles, and a receiving means having infrared ray receiving sensors 72A and 72B arranged on upper, and lower ends of the left, or right side of a display 71 in an Y-axis direction spaced a predetermined distance apart, and an infrared ray receiving sensor 72C and an ultrasonic wave receiving sensor 73 arranged at the center thereof, for receiving the transmitted ultrasonic waves and infrared ray. In this embodiment, coordinates of a pointed position are calculated opposite to the one explained in the first embodiment.

FOURTH EMBODIMENT

Figure 11:
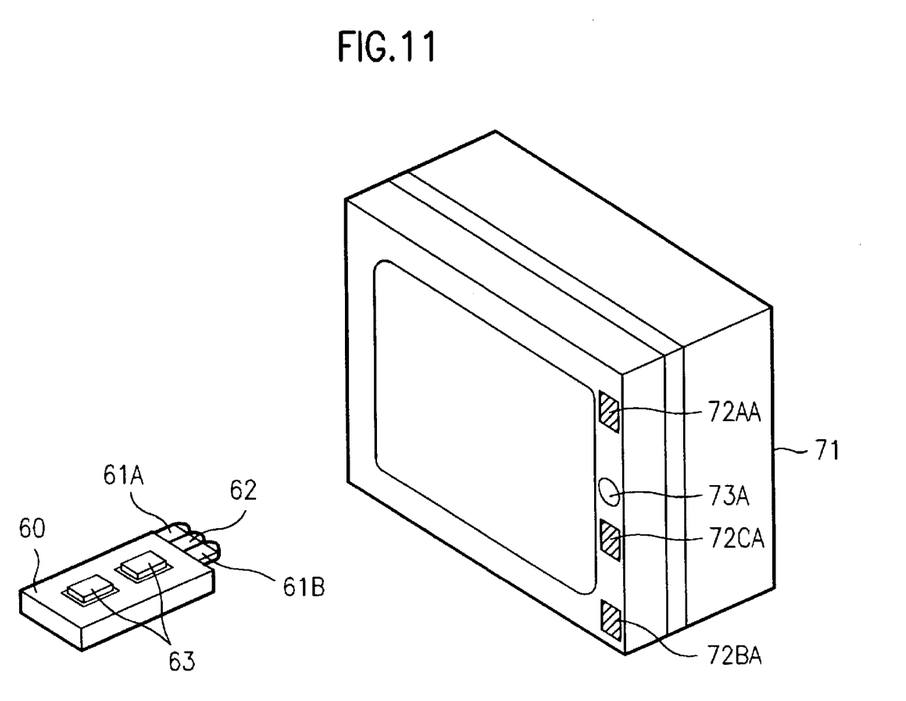
FIG. 11 illustrates a perspective view of a three dimensional wireless pointing device in accordance with a fourth embodiment of the present invention; and, FIG. 12 illustrates a perspective view of a three dimensional wireless pointing device in accordance with a fifth embodiment of the present invention.

FIG. 11 illustrates a perspective view of a three dimensional wireless pointing device in accordance with a fourth embodiment of the present invention.

Referring to FIG. 11, the three dimensional wireless pointing device in accordance with a third embodiment of the present invention includes a position pointing means 60 having ultrasonic wave generating parts 61A and 61B arranged in an X-axis direction at a predetermined angle and an infrared ray emitting part 62 arranged between the ultrasonic wave generating parts 61A and 61B, for transmitting ultrasonic wave signals and infrared ray signal of predetermined cycles, and a receiving means having ultrasonic wave receiving sensors 72AA and 72BA arranged on upper, and lower ends of the left, or right side of a display 71 in an Y-axis direction spaced a predetermined distance apart, and an ultrasonic wave receiving sensor 72CA and an infrared ray receiving sensor 73A arranged at the center thereof, for receiving the transmitted ultrasonic wave signals and the infrared ray. In this embodiment, coordinates of a pointed position are calculated opposite to the one explained in the second embodiment.

FIFTH EMBODIMENT

Figure 12:
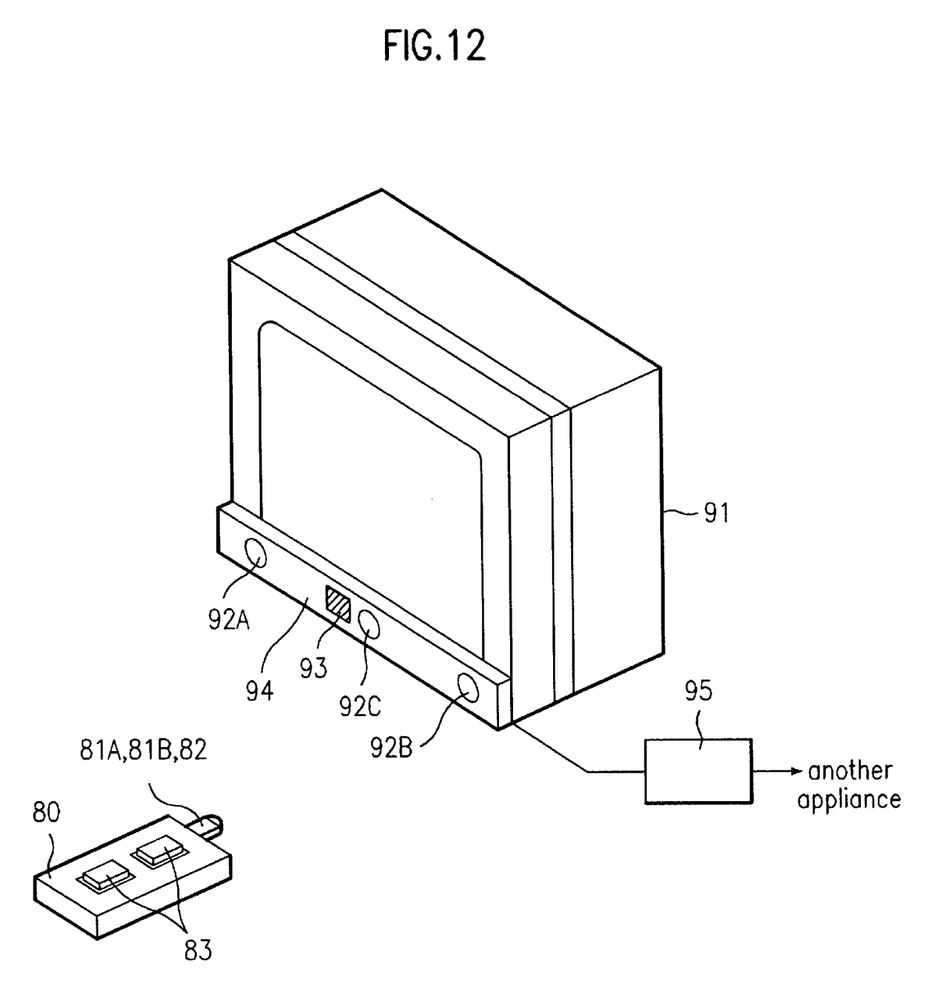

FIG. 12 illustrates a perspective view of a three dimensional wireless pointing device in accordance with a fifth embodiment of the present invention.

Referring to FIG. 12, the three dimensional wireless pointing device in accordance with the fifth embodiment of the present invention includes a separate sensor attachment device 94 for attaching ultrasonic wave receiving sensors 92A, 92B and 92C and an infrared ray receiving sensor 93 for receiving ultrasonic wave signal(s) and infrared ray signal(s) transmitted from a position pointing means 80, thereby the sensors 92A, 92B, 92C and 93 are attached, not on a display 91, but outside of the display 91 to form an external receiving part 95 like an adapter, which may be connected to another appliance.

As has been explained, the three dimensional wireless pointing device of the present invention, including the transmission side having a single ultrasonic wave generating part and the plurality of infrared ray emitting parts or the plurality of ultrasonic wave generating parts and a single infrared ray emitting part arranged on a certain axis direction at certain angles and a reception side having the plurality of ultrasonic wave receiving sensors and a single infrared ray receiving sensor arranged to cross the ultrasonic wave generating part(s) and the infrared ray emitting part(s) in the transmission side at a right angle, thereby to measure intensities of the infrared ray(s) and the ultrasonic wave(s) varied depending on direction of pointing and calculate a difference of relative arrival time of the infrared ray and the ultrasonic wave to obtain coordinate values of a position in a three dimensional space, whereby a position of cursor or menu, which is a control objective, can be controlled using the obtained coordinate values.

It will be apparent to those skilled in the art that various modifications and variations can be made in a three dimensional wireless pointing device of the present invention without departing from the spirit or scope of the invention. Thus, it is intended that the present invention cover the modifications and variations of this invention provided they come within the scope of the appended claims and their equivalents.

What is Claimed is:

1. A three dimensional wireless pointing device comprising:

position pointing means having an ultrasonic wave generating part and a plurality of infrared ray emitting parts arranged in a predetermined axis direction at predetermined angles for generating an ultrasonic wave signal and emitting a plurality of infrared ray signals of different characteristics into a space;

detecting means having a plurality of ultrasonic wave receiving sensors and an infrared ray receiving sensor mounted on different positions on a straight line on a body of an electronic appliance to cross at a right angle to the ultrasonic wave generating part and the plurality infrared ray emitting parts on the position pointing means for receiving the ultrasonic wave signal and the infrared ray signals transmitted from the position pointing means;

spatial position analyzing means for converting the infrared signal detected in the detecting means into a digital signal and a timing signal, comparing the ultrasonic wave signals detected in the detecting means with a reference signal to convert into timing signals, and detecting a phase difference of each of the ultrasonic wave signals with reference to a time when the infrared ray is detected;

coordinate calculating means for calculating a detection time difference of each of the ultrasonic waves detected at the plurality of ultrasonic wave receiving sensors with reference to a detection time of the infrared signal converted into the timing signal in the spatial position analyzing means to obtain a first coordinate value, measuring detected intensities of the plurality of infrared ray signals of different characteristics received from the infrared ray emitting parts and converted into the digital signal in the spatial position analyzing means to obtain a second coordinate value, and calculating an average arrival time of the ultrasonic waves with reference to the time when the infrared rays are detected at the infrared ray receiving sensor to obtain a third coordinate value, thereby to determine a three dimensional relative position between the position pointing means and the detecting means; and, a position controlling means for taking the three dimensional position determined by the coordinate calculating means as the present position caused by a position movement of the position pointing means relative to the detecting means.

2. A device as claimed in claim 1, wherein the position pointing means includes, a key applying part having keys for moving a cursor, selection commands and operation commands, a periodic pulse generating part for receiving a key signal from the key applying part in generation of periodic pulses of a code identifying waveform and a synchronization identifying waveform, a signal producing part for overlapping the periodic pulse signal generated in the periodic pulse generating part with ultrasonic, and infrared carrier signals to convert into the ultrasonic wave signal and the plurality of infrared ray signals of different characteristics, a carrier generating part for generating the ultrasonic carrier signal and the infrared carrier signal and applying to the signal producing part during transmission of the ultrasonic wave signal and the infrared ray signals, and a plurality of signal generating parts having ultrasonic wave generating parts and an infrared ray emitting part for transmitting the ultrasonic wave signal and the plurality of infrared ray signals of different characteristics from the signal producing part into a space.

3. A device as claimed in claim 1, wherein the detecting means includes, the plurality of ultrasonic wave receiving sensors mounted on different positions on a straight line each for receiving the ultrasonic wave signal transmitted from the position pointing means, the infrared ray receiving sensor mounted on a position different from the positions of the ultrasonic wave receiving sensors on the same straight line for receiving the infrared ray signals transmitted from the position pointing means, a plurality of amplifying and filtering parts connected to the plurality of ultrasonic wave receiving sensors and the infrared ray receiving sensor respectively for amplifying the plurality of weak ultrasonic wave signals and the infrared signal received at the plurality of ultrasonic wave receiving sensors and the infrared ray receiving sensor respectively and only passing carrier frequency bands of the signals, and a plurality of envelope detectors for removing carrier signals from outputs of the amplifying and filtering parts and detecting intensity levels of the signals received at the ultrasonic wave receiving sensors and the infrared ray receiving sensor, respectively.

4. A device as claimed in claim 1, wherein the spatial position analyzing means includes, a first comparator for comparing an envelope waveform of the ultrasonic wave signal received at one of the ultrasonic wave receiving sensors with an internal reference signal to convert into a timing signal, a second comparator for comparing an envelope waveform of the ultrasonic wave signal received at a second of the ultrasonic wave receiving sensors with an internal reference signal to convert into a timing signal, a third comparator for comparing an envelope waveform of the ultrasonic wave signal received at a third of the ultrasonic wave receiving sensors with an internal reference signal to convert into a timing signal, an analog-to-digital converter for digitizing an envelope waveform of the infrared ray signal received at the infrared ray receiving sensor, a fourth comparator for comparing an envelope waveform of the infrared ray signal received at the infrared ray receiving sensor with an internal reference signal to convert into a timing signal for using as a reference signal in calculation of coordinates and code analysis, a phase difference detector for detecting a detecting time difference of the ultrasonic wave signal from each of the first to third comparators with reference to a time when the infrared ray from the fourth comparator is detected, and a clock signal generator for generating and applying a clock signal to the phase difference detector.

5. A device as claimed in claim 1, wherein the ultrasonic wave generating part and the plurality of infrared ray emitting parts in the position pointing means are arranged in a Y-axis direction at predetermined angles, and the plurality of ultrasonic wave receiving sensors and the infrared ray receiving sensor in the detecting means are mounted on the body of the electronic appliance in an X-axis direction spaced predetermined distances apart to cross the ultrasonic wave generating part and the plurality of infrared ray emitting parts in the position pointing means at a right angle.

6. A device as claimed in claim 1, wherein the ultrasonic wave generating part and the plurality of infrared ray emitting parts in the position pointing means are arranged in an X-axis direction at predetermined angles, and the plurality of ultrasonic wave receiving sensors and the infrared ray receiving sensor in the detecting means are mounted on the body of the electronic appliance in a Y-axis direction spaced predetermined distances apart to cross the ultrasonic wave generating part and the plurality of infrared ray emitting parts in the position pointing means at a right angle.

7. A device as claimed in claim 1, wherein the ultrasonic wave receiving sensors and the infrared ray receiving sensor in the detecting means are arranged in a system which can be detachable from the body of the electronic appliance.

8. A device as claimed in claim 1, wherein the plurality of infrared ray emitting parts in the position pointing means are arranged at positions different from one another and transmit infrared rays of carrier frequencies different from one another on the same time.

9. A device as claimed in claim 1, wherein the plurality of infrared ray emitting parts in the position pointing means are arranged at positions different from one another and transmit infrared rays of the same carrier frequency at timings different from one another.

10. A device as claimed in claim 1, wherein the plurality of infrared ray emitting parts in the position pointing means are arranged at positions different from one another, and one of the infrared ray emitting parts transmits a longitudinal wave and the other one of the infrared ray emitting parts transmits a transverse wave.

11. A device as claimed in claim 1, wherein the plurality of infrared ray emitting parts in the position pointing means are arranged at positions different from one another, and transmit infrared rays of wavelengths different from one another.

12. A three dimensional wireless pointing device comprising:

position pointing means having a plurality of ultrasonic wave generating parts and an infrared ray emitting part arranged in a predetermined axis direction at predetermined angles for generating a plurality of ultrasonic wave signals of different characteristics and emitting an infrared ray signal into a space;

detecting means having a plurality of ultrasonic wave receiving sensors and an infrared ray receiving sensor mounted on the body of the electronic appliance at different positions on a straight line to cross at a right angle to the plurality of ultrasonic wave generating parts and the infrared ray emitting part in the position pointing means for receiving the ultrasonic wave signals and the infrared ray signal transmitted from the position pointing means;

spatial position analyzing means for converting the infrared signal detected in the detecting means into a digital signal and a timing signal, comparing the ultrasonic wave signals detected in the detecting means with a reference signal to convert into timing signals, and detecting a relative phase difference of each of the ultrasonic wave signals with reference to a time when the infrared ray is detected;

coordinate calculating means for measuring a time difference of an average detection time of each of the ultrasonic waves detected at the plurality of ultrasonic wave receiving sensors with reference to a detection time of the infrared signal converted into the timing signal in the spatial position analyzing means to obtain a first coordinate value, measuring intensities of the plurality of ultrasonic waves of different characteristics received at one of the plurality of ultrasonic wave receiving sensors with reference to the detection time of the infrared signal converted into the timing signal in the spatial position analyzing means to obtain a second coordinate value, and calculating an average arrival time of the ultrasonic waves with reference to the detection time of the infrared ray signal converted into the timing signal in the spatial position analyzing means to obtain a third coordinate value, thereby to determine a three dimensional relative position between the position pointing means and the detecting means; and, a position controlling means for taking the three dimensional position determined by the coordinate calculating means as the present position caused by a position movement of the position pointing means relative to the detecting means.

13. A device as claimed in claim 12, wherein the position pointing means includes, a key applying part having keys for moving a cursor, selection commands and operation commands, a periodic pulse generating part for receiving a key signal from the key applying part in generation of periodic pulses of a code identifying waveform and a synchronization identifying waveform, a signal producing part for overlapping the periodic pulse signal generated in the periodic pulse generating part with the ultrasonic, and infrared carrier signals to convert into the plurality of ultrasonic wave signals of different characteristics and the infrared ray signal, a carrier generating part for generating the ultrasonic carrier signal and the infrared carrier signal and applying to the signal producing part during transmission of the ultrasonic wave signals and the infrared ray signal, and the plurality of ultrasonic wave generating parts and the infrared ray emitting part for transmitting the plurality of ultrasonic wave signals of different characteristics and the infrared ray signal from the signal producing part into a space.

14. A device as claimed in claim 12, wherein the detecting means includes, the plurality of ultrasonic wave receiving sensors mounted on different positions on a straight line each for receiving the ultrasonic wave signals transmitted from the position pointing means, the infrared ray receiving sensor mounted on a position different from the positions of the ultrasonic wave receiving sensors on the same straight line for receiving the infrared ray signal transmitted from the position pointing means, amplifying and filtering parts connected to the plurality of ultrasonic wave receiving sensors and the infrared ray receiving sensor respectively for amplifying the plurality of weak ultrasonic wave signal and the infrared signal received at the plurality of ultrasonic wave receiving sensors and the infrared ray receiving sensor respectively and only passing carrier frequency bands of the signals, and envelope detectors for removing carrier signals from outputs of the amplifying and filtering parts and detecting intensity levels of the signals received at the ultrasonic wave receiving sensors and the infrared ray receiving sensor, respectively.

15. A device as claimed in claim 12, wherein the spatial position analyzing means includes, a first comparator for comparing an envelope waveform of the ultrasonic wave signal received at one of the ultrasonic wave receiving sensors with an internal reference signal to convert into a timing signal, a second comparator for comparing an envelope waveform of the ultrasonic wave signal received at a second of the ultrasonic wave receiving sensors with an internal reference signal to convert into a timing signal, a third comparator for comparing an envelope waveform of the ultrasonic wave signal received at a third of the ultrasonic wave receiving sensors with an internal reference signal to convert into a timing signal, an analog-to-digital converter for digitizing an envelope waveform of the infrared ray signal received at the infrared ray receiving sensor, a fourth comparator for comparing an envelope waveform of the infrared ray signal received at the infrared ray receiving sensor with an internal reference signal to convert into a timing signal for using as a reference signal in calculation of coordinates and code analysis, a phase difference detector for detecting a detecting time difference of the ultrasonic wave signal from each of the first to third comparators with reference to a time when the infrared ray from the fourth comparator is detected, and a clock signal generator for generating and applying a clock signal to the phase difference detector.

16. A device as claimed in claim 12, wherein the plurality of ultrasonic wave generating parts and the infrared ray emitting part in the position pointing means are arranged in a Y-axis direction at predetermined angles, and the plurality of ultrasonic wave receiving sensors and the infrared ray receiving sensor in the detecting means are mounted on the body of the electronic appliance in an X-axis direction spaced predetermined distances apart to cross the plurality of ultrasonic wave generating parts and the infrared ray emitting part in the position pointing means at a right angle.

17. A device as claimed in claim 12, wherein the plurality of ultrasonic wave generating parts and the infrared ray emitting part in the position pointing means are arranged in an X-axis direction at predetermined angles, and the plurality of ultrasonic wave receiving sensors and the infrared ray receiving sensor in the detecting means are mounted on the body of the electronic appliance in a Y-axis direction spaced predetermined distances apart to cross the plurality of ultrasonic wave generating parts and the infrared ray emitting part in the position pointing means at a right angle.

18. A device as claimed in claim 12, wherein the ultrasonic wave receiving sensors and the infrared ray receiving sensor in the detecting means are arranged in a system which can be detachable from the body of the electronic appliance.

19. A device as claimed in claim 12, wherein the plurality of ultrasonic wave generating parts in the position pointing means are arranged at positions different from one another and transmit ultrasonic waves of carrier frequencies different from one another on the same time.

20. A device as claimed in claim 12, wherein the plurality of ultrasonic wave generating parts in the position pointing means are arranged at positions different from one another and transmit ultrasonic waves of the same carrier frequency at timings different from one another.

21. A device as claimed in claim 12, wherein the first coordinate value is the X-axis coordinate value, the second coordinate value is the Y-axis coordinate value, and the third coordinate value is the Z-axis coordinate value.

* * * * *